US011368179B2

(12) United States Patent
Pehlke

(10) Patent No.: US 11,368,179 B2
(45) Date of Patent: Jun. 21, 2022

(54) MODULATION PARTITIONING AND TRANSMISSION VIA MULTIPLE ANTENNAS FOR ENHANCED TRANSMIT POWER CAPABILITY

(71) Applicant: Skyworks Solutions, Inc., Irvine, CA (US)

(72) Inventor: David Richard Pehlke, Westlake Village, CA (US)

(73) Assignee: Skyworks Solutions, Inc., Irvine, CA (US)

(*) Notice: Subject to any disclaimer, the term of this patent is extended or adjusted under 35 U.S.C. 154(b) by 0 days.

(21) Appl. No.: 16/158,707

(22) Filed: Oct. 12, 2018

(65) Prior Publication Data
US 2019/0115946 A1    Apr. 18, 2019

Related U.S. Application Data

(60) Provisional application No. 62/691,196, filed on Jun. 28, 2018, provisional application No. 62/573,523, filed on Oct. 17, 2017.

(51) Int. Cl.
*H04B 1/40* (2015.01)
*H04B 1/04* (2006.01)
(Continued)

(52) U.S. Cl.
CPC ............ *H04B 1/40* (2013.01); *H04B 1/0057* (2013.01); *H04B 1/04* (2013.01);
(Continued)

(58) Field of Classification Search
CPC .......... H04B 1/40; H04B 1/04; H04B 7/0604; H04B 7/0413; H04B 2001/045; H04B 2001/0416; H04W 72/0453
See application file for complete search history.

(56) References Cited

U.S. PATENT DOCUMENTS

2003/0114188 A1    6/2003 Rousu
2010/0157858 A1*   6/2010 Lee .......................... H01Q 9/40
                                                              370/297
(Continued)

FOREIGN PATENT DOCUMENTS

JP          2013-507864 A    3/2013
KR     10-2006-0069507 A     6/2006
(Continued)

OTHER PUBLICATIONS

International Search Report and Written Opinion of the International Searching Authority for International Application No. PCT/US2018/055953 dated Feb. 1, 2019 in 11 pages.
(Continued)

*Primary Examiner* — Sam K Ahn
*Assistant Examiner* — Amneet Singh
(74) *Attorney, Agent, or Firm* — Knobbe, Martens, Olson & Bear, LLP

(57) ABSTRACT

Apparatus and methods for modulation partition and transmission via multiple antennas for enhanced transmit power capability are provided herein. In certain embodiments, an RF communication system includes a transceiver that generates a first RF signal and a second RF signal corresponding to partitions of a modulated RF signal. For example, the first RF signal and the second RF signal can be associated with different RB allocations of one or more channels of a frequency band. The RF communication system further includes a first transmit chain that processes the first RF signal to generate a first RF output signal for transmission on a first antenna, and a second transmit chain that processes the second RF signal to generate a second RF output signal for transmission on a second antenna.

20 Claims, 12 Drawing Sheets

(51) Int. Cl.
 *H04W 72/04* (2009.01)
 *H04B 1/00* (2006.01)
 *H04B 7/0413* (2017.01)
 *H04B 7/06* (2006.01)

(52) U.S. Cl.
 CPC ....... *H04W 72/0453* (2013.01); *H04B 7/0413* (2013.01); *H04B 7/0604* (2013.01); *H04B 2001/045* (2013.01); *H04B 2001/0416* (2013.01)

(56) References Cited

U.S. PATENT DOCUMENTS

| | | | |
|---|---|---|---|
| 2011/0222444 A1* | 9/2011 | Khlat | H03F 3/68 370/277 |
| 2013/0273859 A1 | 10/2013 | King et al. | |
| 2013/0273860 A1 | 10/2013 | Pehlke | |
| 2013/0336181 A1* | 12/2013 | Khlat | H04L 5/06 370/297 |
| 2014/0003300 A1* | 1/2014 | Weissman | H04B 1/0064 370/273 |
| 2014/0321339 A1 | 10/2014 | Pehlke | |
| 2015/0054639 A1 | 2/2015 | Rosen | |
| 2015/0072671 A1* | 3/2015 | Rofougaran | H04B 1/44 455/418 |
| 2015/0133067 A1 | 5/2015 | Chang et al. | |
| 2015/0264688 A1* | 9/2015 | Kahrizi | H04L 5/001 370/329 |
| 2016/0006556 A1 | 1/2016 | Pehlke et al. | |
| 2016/0044677 A1 | 2/2016 | King et al. | |
| 2016/0127016 A1 | 5/2016 | Pehlke et al. | |
| 2016/0134414 A1 | 5/2016 | Pehlke | |
| 2016/0135172 A1 | 5/2016 | Sun et al. | |
| 2016/0241026 A1 | 8/2016 | Pehlke | |
| 2016/0241138 A1 | 8/2016 | Pehlke | |
| 2016/0241197 A1 | 8/2016 | Pehlke | |
| 2016/0241294 A1 | 8/2016 | Pehlke et al. | |
| 2016/0242057 A1 | 8/2016 | Ripley et al. | |
| 2016/0301437 A1 | 10/2016 | Pehlke | |
| 2016/0345298 A1 | 11/2016 | Frank | |
| 2016/0365908 A1 | 12/2016 | Chang et al. | |
| 2017/0013565 A1 | 1/2017 | Pelletier et al. | |
| 2017/0026074 A1 | 1/2017 | King et al. | |
| 2017/0048028 A1 | 2/2017 | Pehlke | |
| 2017/0111066 A1 | 4/2017 | King et al. | |
| 2017/0111074 A1 | 4/2017 | King et al. | |
| 2017/0188366 A1 | 6/2017 | Zhang et al. | |
| 2017/0195106 A1 | 7/2017 | Pehlke | |
| 2017/0222665 A1 | 8/2017 | Chang et al. | |
| 2017/0238308 A1 | 8/2017 | Tiirola et al. | |
| 2017/0244538 A1 | 8/2017 | Chang et al. | |
| 2017/0373730 A1 | 12/2017 | Pehlke et al. | |
| 2018/0019768 A1 | 1/2018 | King et al. | |
| 2018/0048345 A1 | 2/2018 | Pehlke et al. | |
| 2018/0076774 A1 | 3/2018 | Pehlke et al. | |
| 2018/0131500 A1 | 5/2018 | Pehlke | |
| 2018/0159577 A1 | 6/2018 | Pehlke et al. | |
| 2018/0205530 A1 | 7/2018 | Pehlke | |
| 2018/0294858 A1 | 10/2018 | Pehlke | |
| 2018/0323947 A1 | 11/2018 | Brunel et al. | |
| 2018/0352510 A1 | 12/2018 | Wang | |
| 2018/0367173 A1 | 12/2018 | King et al. | |
| 2019/0007073 A1 | 1/2019 | King et al. | |
| 2019/0081649 A1* | 3/2019 | Khlat | H04B 1/1027 |
| 2019/0158137 A1 | 5/2019 | Brunel et al. | |

FOREIGN PATENT DOCUMENTS

| | | |
|---|---|---|
| KR | 10-2016-0020378 A | 2/2016 |
| WO | WO 2010/075190 A2 | 7/2010 |
| WO | WO 2017/078326 A1 | 5/2017 |

OTHER PUBLICATIONS

3G Americas White Paper,"MIMO Transmissions Schemes for LTE and HSPA Networks," 3G Americas, Jun. 2009, 14 pages.
3G PP TS 36.211 , version 12.4.0 Release 12, "ETSI TS 136 211 V. 12.4.0 Technical Specification", Feb. 2015, pp. 13-56.
3GPP TS 36.213, version 12.4.0, Release 12, "ETSI TS 136 213 v12.4.0 Technical Specification," Feb. 2015, pp. 165-215.
3GPP TS 36.213, Version 12.4.0, Release 12, "ETSI TS 136 213 v.12.4.0" Feb. 2015, pp. 127-151.
3GPP TSG RAN WG1, #54 meeting, Discussion memo from Mitsubishi Electric titled Uplink transmit diversity schemes with low cubic metric for LTE-Advanced, Agenda Item 12, Jeju, South Korea, Aug. 18-22, 2008, 6 pages.
3GPP TSG RAN WG1, #54bis, Discussion memo from Huawei titled Initial comparison of UL TX diversity solutions for LTE-Advanced, Prague, Czech Republic, Sep. 29-Oct. 3, 2008, 10 pages.
3GPP TSG RAN WG1, #57bis, Discussion memo from Huawei titled Comparison of UL TX diversity solutions for PUSCH, Los Angeles, USA, Jun. 29-Jul. 3, 2009, 6 pages.
3GPP TSG RAN WG1, #57bis, Discussion and decision memo titled OUCCH TxD Schemes for LTE-A, Los Angeles, USA, Jun. 29-Jul. 3, 2009, 6 pages.
Bulus, U., et al., "Modelling of the Monopole Interaction with a small Chassis," University Duisburg-Essen, Hochfrequenztechnik, Bismarckstr.81,D-47048, Germany, 2009, 4 pages.
Park, C.S., et al., "Evolutions of Uplink MIMO for LTE-Advanced," IEEE Communications Magazine, Feb. 2011 , pp. 112-121.
Villanen, J., "A Wideband Study of the Bandwidth, SAR and Radiation Efficiency of Mobile Terminal Antenna Structures," IEEE International workshop on Antenna Technology, Mar. 2007, pp. 49-52.
Schulz, B., White Paper, "LTE Transmissions Modes and Beamforming" Rhode & Schwarz LTE Beamforming, Jul. 2015, 25 pages.
Simonsson, A., et al., "LTE Downlink 2×2 MIMO with Realistic CSI: Overview and Performance Evaluation," WCNC 2010 proceedings, 6 pages.
Fiberhome, "Discussion on uplink power sharing for LTE-NR," R1-1712271, 3GPP TSG RAN WG1 Meeting #90, Prague, Czech Republic, Aug. 4, 2017, in 2 pages.
International Preliminary Report on Patentability for International Application No. PCT/US2018/055953, dated Apr. 21, 2020.

* cited by examiner

MODULATION PARTITIONING AND TRANSMISSION VIA MULTIPLE ANTENNAS FOR ENHANCED TRANSMIT POWER CAPABILITY

CROSS-REFERENCE TO RELATED APPLICATIONS

This application claims the benefit of priority under 35 U.S.C. § 119 of U.S. Provisional Patent Application No. 62/691,196, filed Jun. 28, 2018 and titled "MODULATION PARTITIONING AND TRANSMISSION VIA MULTIPLE ANTENNAS FOR ENHANCED TRANSMIT POWER CAPABILITY," and of U.S. Provisional Patent Application No. 62/573,523, filed Oct. 17, 2017 and titled "MODULATION PARTITIONING AND TRANSMISSION VIA MULTIPLE ANTENNAS FOR ENHANCED TRANSMIT POWER CAPABILITY," each of which is herein incorporated by reference in its entirety.

BACKGROUND

Field

Embodiments of the invention relate to electronic systems, and in particular, to radio frequency electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about 450 MHz to about 6 GHz for certain communications standards.

Examples of RF communication systems include, but are not limited to, mobile phones, tablets, base stations, network access points, customer-premises equipment (CPE), laptops, and wearable electronics.

SUMMARY

In certain embodiments, the present disclosure relates to a mobile device. The mobile device includes a plurality of antennas including a first antenna and a second antenna, a front end system including a first front-end module electrically connected to the first antenna and a second front-end module electrically connected to the second antenna, and a transceiver configured to generate a first radio frequency signal and a second radio frequency signal based on partitioning a transmit signal of a frequency band. The transceiver is further configured to provide the first radio frequency signal to the first front-end module for transmission on the first antenna and to provide the second radio frequency signal to the second front-end module for transmission on the second antenna.

In some embodiments, the first front-end module includes a first power amplifier configured to amplify the first radio frequency signal, and the second front-end module includes a second power amplifier configured to amplify the second radio frequency signal.

In various embodiments, the first radio frequency signal and the second radio frequency signal correspond to non-contiguous resource block allocations in a common channel of the frequency band.

In several embodiments, the first radio frequency signal corresponds to a first resource block allocation in a first channel of the frequency band, and the second radio frequency signal corresponds to a second resource block allocation in a second channel of the frequency band. According to a number of embodiments, the first channel and the second channel are contiguous in frequency but the first and second resource block allocations are non-contiguous. In accordance with various embodiments, the first channel and the second channel are non-contiguous in frequency and the first and second resource block allocations are separated in frequency. According to some embodiments, the first and second resource block allocations are separated in frequency by less than about 35 megahertz.

In a number of embodiments, the first front-end module includes a different configuration of filters relative to the second front-end module. According to several embodiments, the first front-end module includes one or more filters for filtering a first sub-band of the frequency band, and the second front-end module includes one or more filters for filtering a second sub-band of the frequency band. In accordance with various embodiments, the first transmit chain does not include any filters for filtering the second sub-band, and the second transmit chain does not include any filters for filtering the first sub-band. According to several embodiments, the frequency band corresponds to Band 71 or Band 28.

In various embodiments, the frequency band is specified by Third Generation Partnership Project (3GPP). In a number of embodiments, the frequency band is specified by Long Term Evolution (LTE).

In several embodiments, the first front-end module and the second front-end module includes a substantially identical configuration of filters.

In some embodiments, the modulated signal is a carrier aggregated signal.

In certain embodiments, the present disclosure relates to a radio frequency communication system. The radio frequency communication system includes a plurality of antennas including a first antenna and a second antenna, a plurality of transmit chains including a first transmit chain configured to transmit on the first antenna and a second transmit chain configured to transmit on the second antenna, and a transceiver configured to partition a modulated signal of a frequency band to generate a first radio frequency signal and a second radio frequency signal, and to provide the first radio frequency signal to the first transmit chain for transmission on the first antenna and to provide the second radio frequency signal to the second transmit chain for transmission on the second antenna.

In various embodiments, the first radio frequency signal and the second radio frequency signal correspond to non-contiguous resource block allocations in a common channel of the frequency band.

In a number of embodiments, the first radio frequency signal corresponds to a first resource block allocation in a first channel of the frequency band, and the second radio frequency signal corresponds to a second resource block allocation in a second channel of the frequency band. According to various embodiments, the first channel and the second channel are contiguous in frequency but the first and second resource block allocations are non-contiguous. In accordance with several embodiments, the first channel and the second channel are non-contiguous in frequency and the first and second resource block allocations are separated in frequency. According to a number of embodiments, the first and second resource block allocations are separated in frequency by less than about 35 megahertz.

In various embodiments, the frequency band is specified by Third Generation Partnership Project (3GPP). In a number of embodiments, the frequency band is specified by Long Term Evolution (LTE).

In some embodiments, the modulated signal is a carrier aggregated signal.

In several embodiments, the first transmit chain includes a first power amplifier configured to amplify the first radio frequency signal, and the second transmit chain includes a second power amplifier configured to amplify the second radio frequency signal.

In various embodiments, the first transmit chain and the second transmit chain includes a substantially identical configuration of filters.

In some embodiments, the first transmit chain includes a different configuration of filters relative to the second transmit chain. According to various embodiments, the first transmit chain includes one or more filters for filtering a first sub-band of the frequency band, and the second transmit chain includes one or more filters for filtering a second sub-band of the frequency band. In accordance with a number of embodiments, the first transmit chain does not include any filters for filtering the second sub-band, and the second transmit chain does not include any filters for filtering the first sub-band. According to several embodiments, the frequency band corresponds to Band 71 or Band 28.

In certain embodiments, the present disclosure relates to a method of signal transmission in a radio frequency communication device. The method includes partitioning a modulated signal of a frequency band into at least a first radio frequency signal and a second radio frequency signal, processing the first radio frequency signal using a first transmit chain to generate a first radio frequency output signal, transmitting the first radio frequency output signal using a first antenna, processing the second radio frequency signal using a second transmit chain to generate a second radio frequency output signal, and transmitting the second radio frequency output signal using a second antenna.

In some embodiments, processing the first radio frequency signal using the first transmit chain includes amplifying the first radio frequency signal using a first power amplifier, and processing the second radio frequency signal using the second transmit chain includes amplifying the second radio frequency signal using a second power amplifier.

In various embodiments, the method further includes providing substantially identical filtering to the first frequency radio signal and the second radio frequency signal.

In several embodiments, the method further includes filtering the first radio frequency signal using one or more filters of a first sub-band of the frequency band, and filtering the second radio frequency signal using one or more filters of a second sub-band of the frequency band. In a number of embodiments, the frequency band corresponds to Band 71 or Band 28.

In several embodiments, the first radio frequency signal and the second radio frequency signal correspond to non-contiguous resource block allocations in a common channel of the frequency band.

In a number of embodiments, the first radio frequency signal corresponds to a first resource block allocation in a first channel of the frequency band, and the second radio frequency signal corresponds to a second resource block allocation in a second channel of the frequency band. According to various embodiments, the first channel and the second channel are contiguous in frequency but the first and second resource block allocations are non-contiguous. In accordance with several embodiments, the first channel and the second channel are non-contiguous in frequency and the first and second resource block allocations are separated in frequency. According to several embodiments, the first and second resource block allocations are separated in frequency by less than about 35 megahertz.

In various embodiments, the frequency band is specified by Third Generation Partnership Project. In accordance with a number of embodiments, the frequency band is specified by Long Term Evolution.

In some embodiments, the modulated signal is a carrier aggregated signal.

DETAILED DESCRIPTION OF EMBODIMENTS

Figure 1:
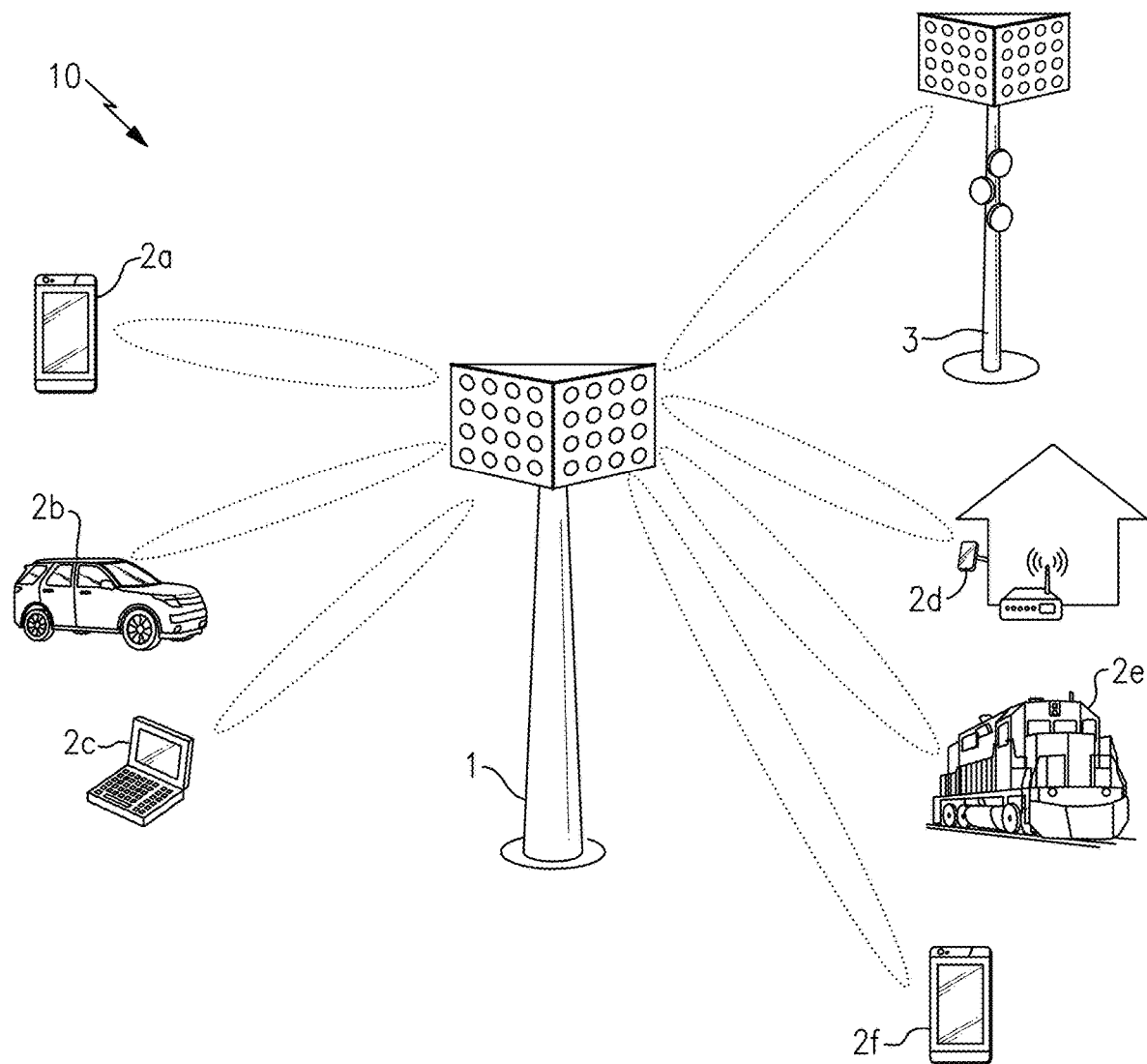
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, and a second mobile device 2f.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices.

The illustrated communication network 10 of FIG. 1 supports communications using a variety of technologies, including, for example, 4G LTE, 5G NR, and wireless local area network (WLAN), such as Wi-Fi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and Wi-Fi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed Wi-Fi frequencies).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Examples of Radio Frequency Systems with Modulation Partitioning

Implementing RF communication systems to support modulation of a relatively wide bandwidth poses a number of technical challenges. For example, it can be difficult to extend bandwidth of an RF communication system to support wideband digital pre-distortion (DPD) because of limitations in sampling rate capability and/or digital power consumption in the baseband modem.

Furthermore, intermodulation and associated spectral regrowth emissions of the transmit chain of the RF front-end become a limiting factor. For example, restrictions in out-of-channel and/or out-of-band emissions result in power back-offs and/or limited power capability for coverage of higher data rate features. For instance, certain maximum power reduction (MPR) back-offs are specified up to about 18 dB for non-contiguous resource block (RB) allocations in LTE. However, once power is backed-off to meet emission specifications, the resulting uplink power capability of the RF communication system (for instance, UE) is so low that the feature is virtually unusable due to the limited coverage area within the cell.

Conventional RF communication systems transmit a modulated signal through a single transmit chain associated with one power amplifier and one antenna. Thus, the power amplifier amplifies a full bandwidth of the modulated signal.

However, transmitting a modulated signal through a single transmit chain can lead to reduced performance when the modulated signal has wide bandwidth, for instance, a wide contiguous modulation or a modulation associated with separated RB allocations. For example, when a transmit chain processes such a modulated signal, the RF circuits along the transmit chain must operate with stringent linearity specifications to address limitations in permitted emission levels.

Apparatus and methods for modulation partition and transmission via multiple antennas for enhanced transmit power capability are provided herein. In certain embodiments, an RF communication system includes a transceiver that generates a first RF signal and a second RF signal corresponding to partitions of a modulated RF signal. For example, the first RF signal and the second RF signal can be associated with different RB allocations of one or more channels of a frequency band. The RF communication system further includes a first transmit chain that processes the first RF signal to generate a first RF output signal for transmission on a first antenna, and a second transmit chain that processes the second RF signal to generate a second RF output signal for transmission on a second antenna.

Thus, rather than processing a complete modulated signal (contiguous or non-contiguous) through one power amplifier and one antenna, the RF communication systems herein partition the modulation such that separate transmit chains (each with a power amplifier) amplify portions of the modulated signal for transmission on separate antennas.

By implementing the RF communication system in this manner, a number of benefits are achieved, including, but not limited to, relaxed baseband modulation sampling rate, relaxed DPD, enhanced RF front-end linearity, and/or higher transmit power. Moreover, enhanced RF front-end intermodulation performance is achieved by leveraging antenna isolation provided by separate transmissions.

Accordingly, the RF communication systems herein can achieve superior intermodulation and/or emissions behavior, thereby providing higher output power capability for UE. For example, the RF communication system can operate with transmissions that are more linear, and thus meet emissions specifications with little to no MPR. Furthermore, in certain implementations, the hardware supporting transmission of a partitioned modulation also can be used to support spatial diversity MIMO and/or transmit diversity for uplink communications, thereby enhancing flexibility.

By partitioning a modulation into separate signals for transmission via separate power amplifiers and antennas, higher transmit power and lower emissions can be achieved, even when the modulation is associated with non-contiguous clusters of concentrated signal power in separated RB allocations.

Figure 2:
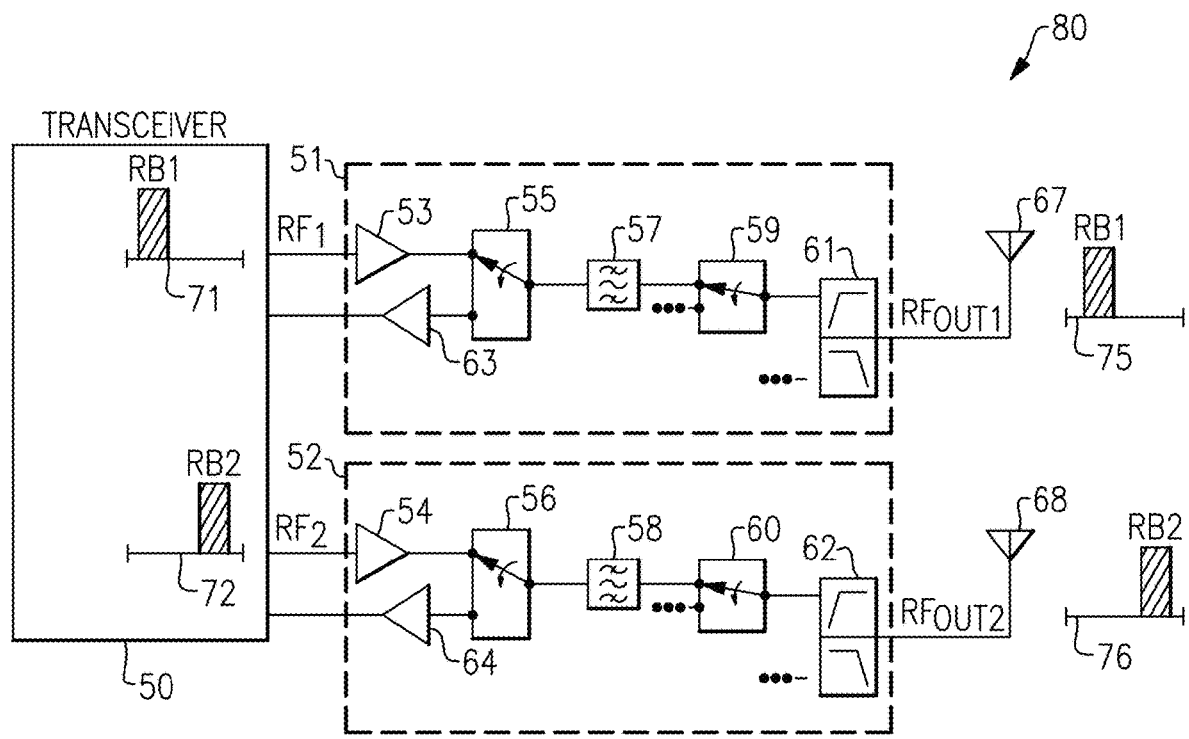
FIG. 2 is a schematic diagram of one embodiment of an RF communication system.

FIG. 2 is a schematic diagram of one embodiment of an RF communication system 80. The RF communication system 80 includes a transceiver 50, a first transmit chain 51, a second transmit chain 52, a first antenna 67, and a second antenna 68. As shown in FIG. 2, the first transmit chain 51 is coupled between the transceiver 50 and the first antenna 67, and the second transmit chain 52 is coupled between the transceiver 50 and the second antenna 68. Although one embodiment of an RF communication system is shown, the teachings herein are applicable to RF communication systems implemented in a wide variety of ways.

In the illustrated embodiment, the first transmit chain 51 includes a first power amplifier 53, a first transmit/receive switch 55, a first band filter 57, a first antenna switch 59, and a first diplexer 61. Additionally, the second transmit chain 52 includes a second power amplifier 54, a second transmit/receive switch 56, a second band filter 58, a second antenna switch 60 and a second diplexer 62.

Although one example implementation of transmit chains is shown, other implementations of transmit chains are possible. For example, a wide range of components and circuitry can be present between an output of a power amplifier and an antenna and/or between a transceiver and an input to a power amplifier.

Examples of such components and circuitry include, but are not limited to, one or more switches, one or more matching networks, one or more harmonic termination circuits, one or more filters, one or more resonators, one or more duplexers, one or more detectors, one or more directional couplers, one or more bias circuits, and/or one or more frequency multiplexers (for instance, diplexers, triplexers, quadplexers, etc.).

Although referred to as a transmit chain, in certain implementations the transmit chain can also be used in part for processing received signals. In one example, a first LNA 63 and a second LNA 64 can be coupled to the first transmit/receive switch 55 and the second transmit/receive switch 56, respectively, for processing signals received from the first antenna 67 and the second antenna 68.

In the illustrated embodiment, the first transmit chain 51 processes a first RF signal $RF_1$ from the transceiver 50 to generate a first RF output signal $RF_{OUT1}$ for the first antenna 67, and the second transmit chain 52 processes a second RF signal $RF_2$ from the transceiver 50 to generate a second RF output signal $RF_{OUT2}$ for the second antenna 68.

As shown in FIG. 2, the first RF signal $RF_1$ has a frequency content 71 associated with a first RB allocation RB1, and the second RF signal $RF_2$ has a frequency content 72 associated with a second RB allocation RB2. The first RF output signal $RF_{OUT1}$ and the second RF output signal $RF_{OUT2}$ have a frequency content 75 and a frequency content 76, respectively, in this embodiment. However, other frequency contents are possible. For example, diplexing can result in additional signal components at other signal frequencies.

The first RF signal $RF_1$ and the second RF signal $RF_2$ correspond to partitions of a modulated signal. For example, the first RF signal $RF_1$ and the second RF signal $RF_2$ can be associated with different RB allocations of one or more channels of a common frequency band. Examples of the first RF signal $RF_1$ and the second RF signal $RF_2$ are described below with reference to FIGS. 3A-3C.

Thus, rather than processing a complete modulated signal (contiguous or non-contiguous) through one power amplifier and one antenna, the RF communication systems herein partition the modulation such that separate transmit chains (each with a power amplifier) amplify portions of the modulated signal for transmission on separate antennas.

Although an example in which the modulated signal is partitioned into two RF signals is shown, the teachings herein are also applicable to partitions of a modulated signal into three or more RF signals. Thus, an RF communication system can include three or more transmit chains and three or more antennas for transmitting RF partitions of a modulated signal.

By implementing the RF communication system 80 with partitioning, a number of benefits are achieved, including, but not limited to, relaxed baseband modulation sampling rate and DPD, enhanced RF front-end linearity, and/or enhanced RF front-end intermodulation performance by leveraging antenna isolation provided by separate transmissions.

In contrast, processing a non-contiguous intra-band carrier aggregation signal using a single transmit chain for transmission on a single antenna can result in large MPR back-off to meet emissions specifications.

Thus, the RF communication system 80 can be used to partition a modulated signal into multiple RF signals for transmission via separate transmit chains and separate antennas. By implementing the RF communication system 80 in this manner, higher power can be transmitted due to lower intermodulation distortion provided by the antenna-to-antenna isolation and/or lower conversion gain for injected noise.

Figures 3A, 3B, 3C:
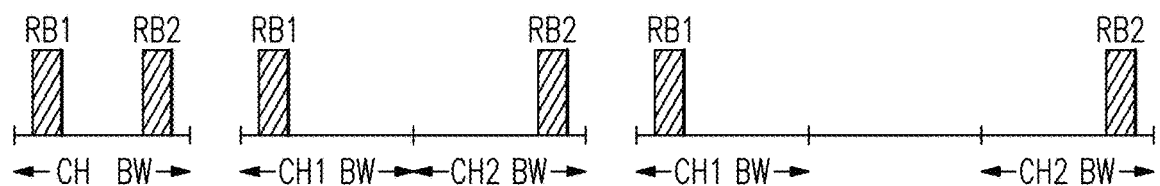
FIG. 3A is a frequency spectrum plot for one example of a single carrier with non-contiguous resource block (RB) allocation.
FIG. 3B is a frequency spectrum plot for one example of carrier aggregation using two contiguous carriers with non-contiguous RB allocation.
FIG. 3C is a frequency spectrum plot for one example of carrier aggregation using two nearby non-contiguous carriers with non-contiguous RB allocation.

FIG. 3A is a frequency spectrum plot for one example of a single carrier with non-contiguous RB allocation. FIG. 3A illustrates one example of resource block allocations corresponding to the first RF signal $RF_1$ and second RF signal $RF_2$ of FIG. 2.

As shown in FIG. 3A, the channel bandwidth (CH BW) of a single carrier of a frequency band is depicted. Additionally, a non-contiguous RB allocation is shown, including one or more resource blocks RB1 separated in frequency from one or more resource blocks RB2. Thus, the allocations for RB1 and RB2 are non-contiguous.

In various embodiments herein, an RF communication system operates to transmit a first RF signal associated with resource blocks RB1 through a first power amplifier and a first antenna, and to transmit a second RF signal associated with resource blocks RB2 through a second power amplifier and a second antenna.

In contrast, conventional RF communication systems transmit a carrier aggregated RF signal associated with non-contiguous RB allocation via a common power amplifier and common antenna.

By partitioning the modulation into separate RF signals for transmission through separate power amplifiers and antennas, enhanced transmit power capability can be achieved. In contrast, when the non-contiguous RB allocated is transmitted via a common power amplifier and common antenna, intermodulation and emissions result in a need to increase power back-off, leading to reduced transmit power capability.

FIG. 3B is a frequency spectrum plot for one example of carrier aggregation using two contiguous carriers with non-contiguous RB allocation. FIG. 3B illustrates another example of resource block allocations corresponding to the first RF signal $RF_1$ and second RF signal $RF_2$ of FIG. 2.

As shown in FIG. 3B, the channel bandwidths of two contiguous carriers of a common frequency band are depicted. Additionally, a non-contiguous RB allocation is shown, including one or more resource blocks RB1 separated in frequency from one or more resource blocks RB2. Thus, the allocations for RB1 and RB2 are non-contiguous.

In various embodiments herein, an RF communication system operates to transmit a first RF signal associated with resource blocks RB1 through a first power amplifier and a first antenna, and to transmit a second RF signal associated with resource blocks RB2 through a second power amplifier and a second antenna.

FIG. 3C is a frequency spectrum plot for one example of carrier aggregation using two nearby non-contiguous carriers with non-contiguous RB allocation. FIG. 3C illustrates another example of resource block allocations corresponding to the first RF signal $RF_1$ and second RF signal $RF_2$ of FIG. 2.

As shown in FIG. 3C, the channel bandwidths of two nearby non-contiguous carriers of a common frequency band are depicted. The non-contiguous carriers are of the same frequency band and relatively close in frequency, for instance, separated by less than about 35 megahertz (MHz). Additionally, a non-contiguous RB allocation is shown, including one or more resource blocks RB1 separated in frequency from one or more resource blocks RB2. Thus, the allocations for RB1 and RB2 are non-contiguous.

In various embodiments herein, an RF communication system operates to transmit a first RF signal associated with resource blocks RB1 through a first power amplifier and a first antenna, and to transmit a second RF signal associated with resource blocks RB2 through a second power amplifier and a second antenna.

Figure 4A:
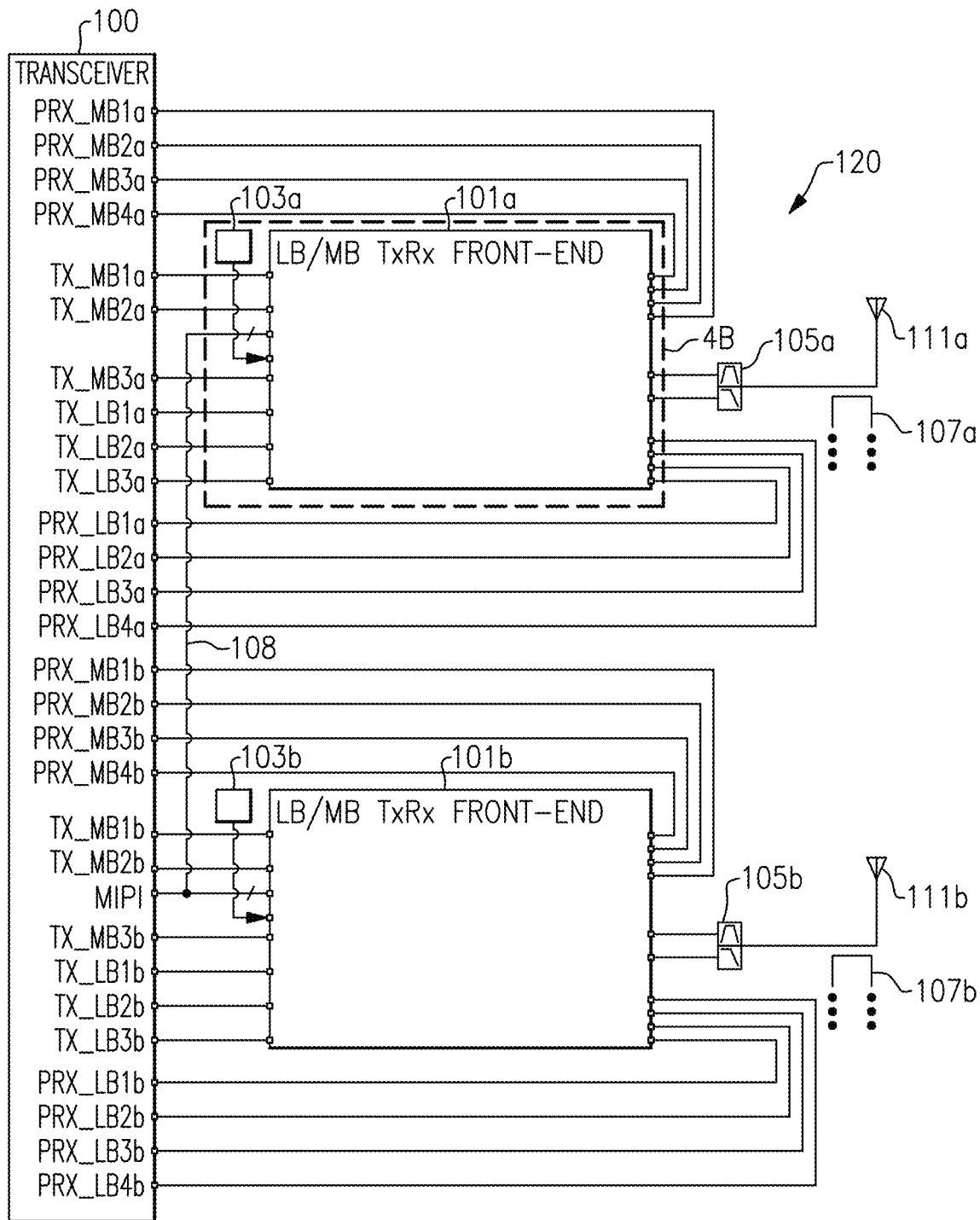
FIG. 4A is a schematic diagram of another embodiment of an RF communication system.

FIG. 4A is a schematic diagram of another embodiment of an RF communication system 120. The RF communication system 120 includes a first front-end module 101a, a second front-end module 101b, a first power management circuit (for instance, a DC-to-DC converter) 103a, a second power management circuit 103b, a first diplexer 105a, a second diplexer 105b, a first directional coupler 107a, a second directional coupler 107b, a first antenna 111a, and a second antenna 111b.

In the illustrated embodiment, the transceiver 100 is coupled to the first front-end module 104a by various terminals or ports including a first primary mid band receive terminal (PRX_MB1a), a second primary mid band receive terminal (PRX_MB2a), a third primary mid band receive terminal (PRX_MB3a), a fourth primary mid band receive terminal (PRX_MB4a), a first primary mid band transmit terminal (TX_MB1a), a second primary mid band transmit terminal (TX_MB2a), a third primary mid band transmit terminal (TX_MB3a), a first primary low band transmit terminal (TX_LB1a), a second primary low band transmit terminal (TX_LB2a), a third primary low band transmit terminal (TX_LB3a), a first primary low band receive terminal (PRX_LB1a), a second primary low band receive terminal (PRX_LB2a), a third primary low band receive terminal (PRX_LB3a), and a fourth primary low band receive terminal (PRX_LB4a).

The transceiver 100 is also coupled to the second front-end module 104b by various terminals including a first primary mid band receive terminal (PRX_MB1b), a second primary mid band receive terminal (PRX_MB2b), a third primary mid band receive terminal (PRX_MB3b), a fourth primary mid band receive terminal (PRX_MB4b), a first primary mid band transmit terminal (TX_MB1b), a second primary mid band transmit terminal (TX_MB2b), a third primary mid band transmit terminal (TX_MB3b), a first primary low band transmit terminal (TX_LB1b), a second primary low band transmit terminal (TX_LB2b), a third primary low band transmit terminal (TX_LB3b), a first primary low band receive terminal (PRX_LB1b), a second primary low band receive terminal (PRX_LB2b), a third primary low band receive terminal (PRX_LB3b), and a fourth primary low band receive terminal (PRX_LB4b).

The transceiver 100 is also coupled to the first front-end module 104a and the second front-end module 104b by an interface 108. In the illustrated embodiment, the interface 108 corresponds to a mobile industry processor interface radio frequency front-end (MIPI RFFE) bus. However, other types of interfaces can be used, including, but not limited to, an inter-integrated circuit (I$^2$C) bus.

Although one example of terminals is shown, a transceiver and/or front-end module can be implemented with a wide range of ports or terminals, including, but not limited to, terminals selected for a particular application. Accordingly, other implementations are possible.

The transceiver 100 uses the first front-end module 104a and the second front end module 104b to transmit partitions of a modulated RF signal. In particular, the transceiver 100 partitions the modulated RF signal into a first RF signal that is processed by the first front-end module 104a and transmitted by the first antenna 111a, and a second RF signal that is processed by the second front-end module 104b and transmitted by the second antenna 111b.

Thus, the first front-end module 104a includes a first transmit chain that processes the first RF signal to generate a first RF output signal for transmission on the first antenna 111a. Additionally, the second front-end module 104b includes a second transmit chain the processes the second RF signal to generate the second RF output signal for transmission on the second antenna 111b.

The first RF signal and the second RF signal can be associated with different RB allocations of one or more channels of a frequency band. In this embodiment, the transceiver 100 is implemented to support partitioning of low band (LB) and/or mid band (MB) signals. However, the teachings herein are also applicable to partitions of other types of signals including, but not limited to, high band (HB) and/or ultra high band (UHB) signals.

As used herein, LB refers to RF signal bands having a frequency content of 1 GHz or less, MB refers to RF signal bands having a frequency content between 1 GHz and 2.3 GHz, HB refers to RF signal bands having a frequency content between 2.3 GHz and 3 GHz, and UHB refers to RF signal bands having a frequency content between 3 GHz and 6 GHz.

Examples of LB frequencies include, but are not limited to Band 8, Band 20, and Band 26. Examples of MB frequencies include, but are not limited to, Band 1, Band 3, Band 4, and Band 66. Examples of HB frequencies include, but are not limited to, Band 7, Band 38, and Band 41. Examples of UHB frequencies include, but are not limited to, Band 42, Band 43, and Band 48.

Thus, rather than processing a complete modulated signal (contiguous or non-contiguous) through one power amplifier and one antenna, the RF communication system 120 partitions RF signal modulation such that separate transmit chains (including separate power amplifiers) amplify portions of the modulated signal for transmission on separate antennas. In this embodiment, the separate transmit chains are present on separate modules. However, the teachings here are also applicable to partitioning within a common module and/or semiconductor chip.

Figure 4B:
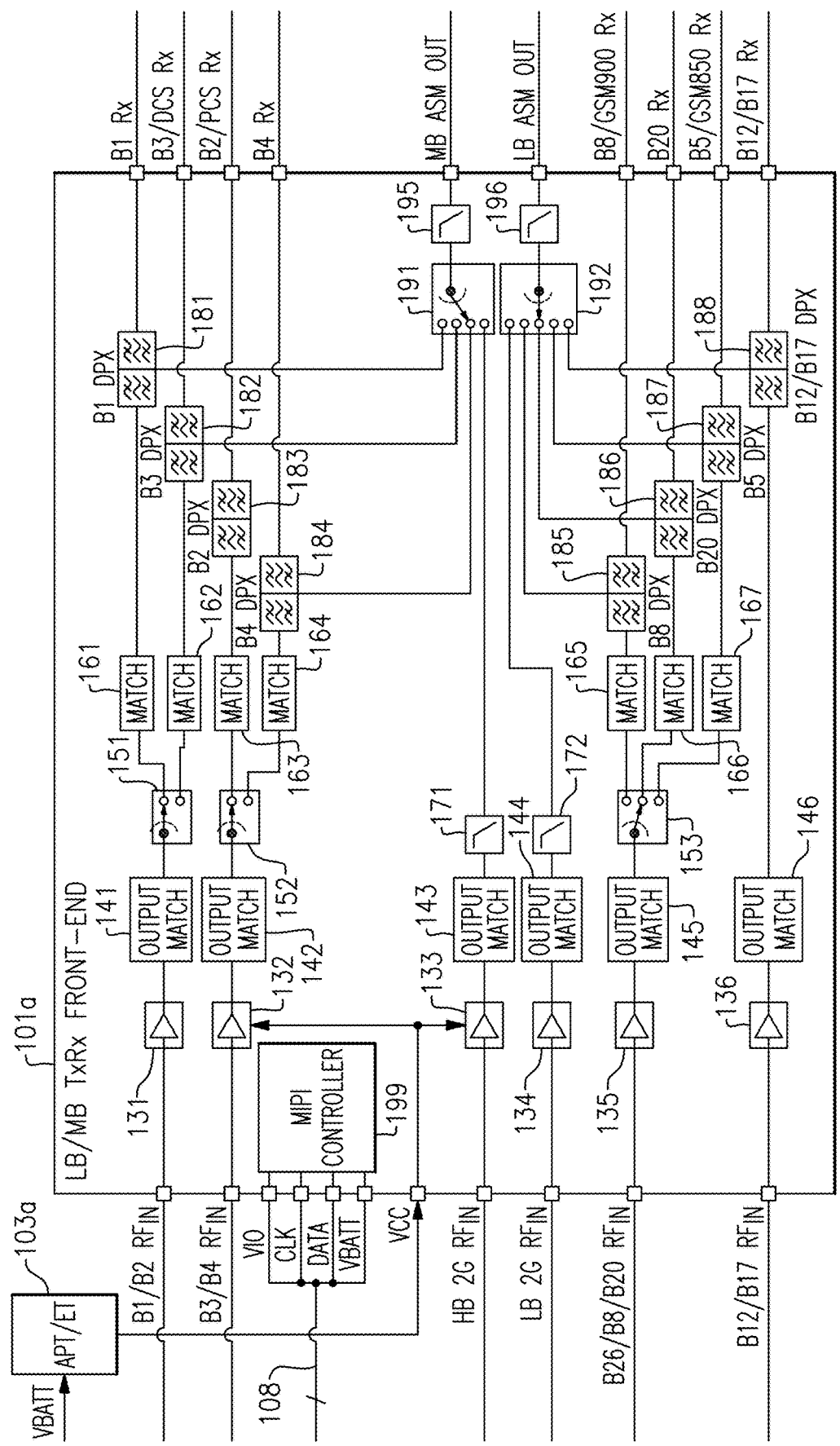
FIG. 4B is a schematic diagram of one embodiment of the front-end module of the RF communication system of FIG. 4A.

FIG. 4B is a schematic diagram of one embodiment of the first front-end module 101a of the RF communication system 120 of FIG. 4A. In certain implementations, the second front-end module 101b is implemented with similar components and circuitry as the first front-end module 101a. However, other implementations are possible. In the illustrated embodiment, the first front-end module 101a operates as a LB/MB transmit/receive (TxRx) front-end.

Although one embodiment of a front-end module is shown, the teachings herein are applicable to RF circuitry implemented in a wide variety of ways.

As shown in FIG. 4B, the first front-end module 101a includes a first power amplifier 131 for amplifying Band 1/Band 2, a second power amplifier 132 for amplifying Band 3/Band 4, a third power amplifier 133 for amplifying HB 2G, a fourth power amplifier 134 for amplifying LB 2G, a fifth power amplifier 135 for amplifying Band 26/Band 8/Band 20, and a sixth power amplifier 136 for amplifying Band 12/Band 17. The first front-end module 101a further includes first to sixth output matching circuits 141-146 for providing output matching to the first to sixth power amplifiers 131-136, respectively.

With continuing reference to FIG. 4B, the first front-end module 101a further includes first to third band selection switches 151-153, respectively, first to seventh matching circuit 161-167, respectively, first and second low pass filters 171-172, respectively, first to eighth duplexers 181-188, respectively, first and second antenna switches 191-192, respectively, first and second output low pass filters 195-196, respectively, and a Mobile Industry Processor Interface (MIPI) controller 199.

The MIPI controller 199 is coupled to a bus 108 that receives data used for controlling a variety of settings of the front end module 101a. In certain implementations, the MIPI controller 199 includes a bias circuit for biasing one or more of the illustrated components, and data received over the bus 108 is used to control one or more bias settings of the bias circuit.

Although one example implementation of a front-end module is shown, other implementations are possible. For example, the RF communication systems herein can include transmits chains that are implemented with a wide range of circuits, components, and/or design topologies.

Conventional radio frequency communication systems transmit a modulated signal through a single transmit chain associated with one power amplifier and one antenna.

In contrast, the RF communication system 120 is implemented to provide partitioning to one more modulated signals, such as modulated signals associated with LTE bands 1, 2, 3, 4, 5, 8, 12, 17, 20 and/or 26. Although one example of bands that can be portioned are shown other implementations are possible, including, but not limited to, implementations additionally or alternatively using LTE bands 7, 13, 25, 38, 43, and/or 71. Furthermore, the teachings herein are also applicable to other communication technologies additionally or alternatively to LTE, including, but not limited to, 5G NR.

Figure 5A:
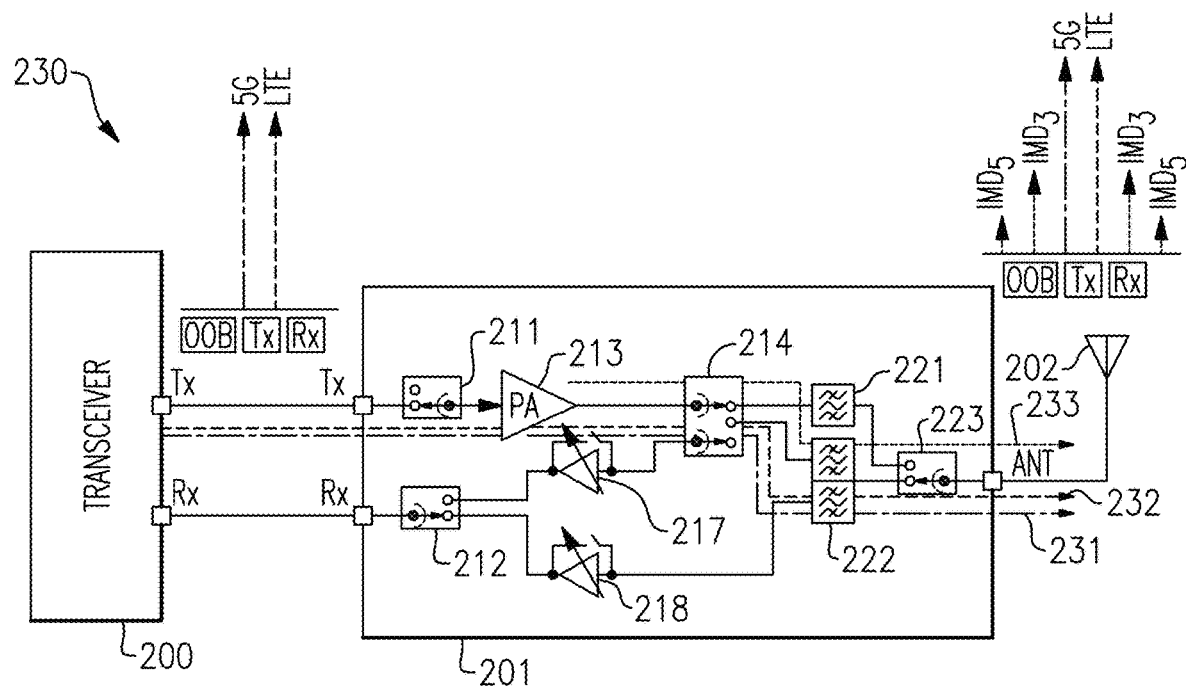
FIG. 5A is a schematic diagram of an RF communication system including one example of annotations related to intermodulation distortion.

FIG. 5A is a schematic diagram of an RF communication system 230 including one example of annotations related to intermodulation distortion. The RF communication system 230 includes a transceiver 200, a front-end module 201, and an antenna 202. The front-end module 201 includes a transmit selection switch 211, a receive selection switch 212, a power amplifier 213, a band selection transmit/receive switch 214, a TDD LNA 217, an FDD LNA 218, a TDD filter 221, an FDD duplexer 222, and an antenna switch 223.

In this example, an RF signal including an LTE component and a 5G component is transmitted through the transmit chain associated with the front-end module 201. The RF signal includes an LTE component and 5G component are in the same frequency band.

In certain implementations, a communication network allocates a particular user device (for instance, a mobile phone or other UE) with a primary component carrier (PCC) or anchor carrier, which is used for communications when only a single frequency carrier is used. To enhance bandwidth, the PCC can be selectively aggregated with one or more secondary component carriers (SCCs). In certain implementations, the LTE component corresponds to an anchor carrier and the 5G component corresponds to a secondary component carrier, or vice versa.

The RF communication system 230 has been annotated to show a 5G signal path 231, an LTE signal path 232, and an intermodulation path 233. When a non-contiguous frequency allocation is amplified by a single power amplifier 213, large intermodulation distortion can be transmitted by the antenna 202, in violation of regulatory radiated emissions limits. In order to comply with intermodulation and emissions specifications, the RF communication system 230 can be operated with MPR back-off to improve linearity. However, operating with such an MPR back-off constrains output power capability, which results in decreased communication distance, degraded signal-to-noise ratio (SNR), and/or significantly decreased DC efficiency.

Figure 5B:
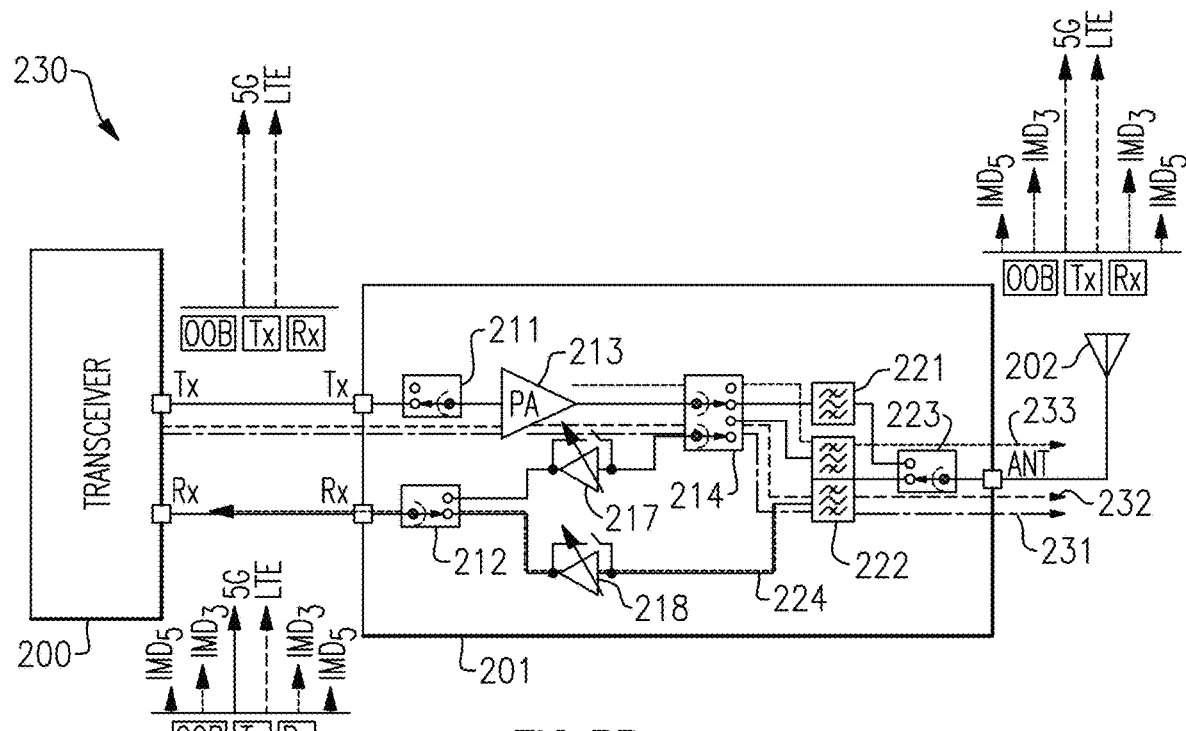
FIG. 5B is a schematic diagram of the RF communication system of FIG. 5A including another example of annotations related to intermodulation distortion.

FIG. 5B is a schematic diagram of the RF communication system 230 of FIG. 5A including another example of annotations related to intermodulation distortion. The annotations are similar to those shown in FIG. 5A, except than an additional intermodulation path 224 is shown. The intermodulation path 224 provides a blocker or jammer signal to the receive chain associated with the FDD LNA 218.

Figure 6A:
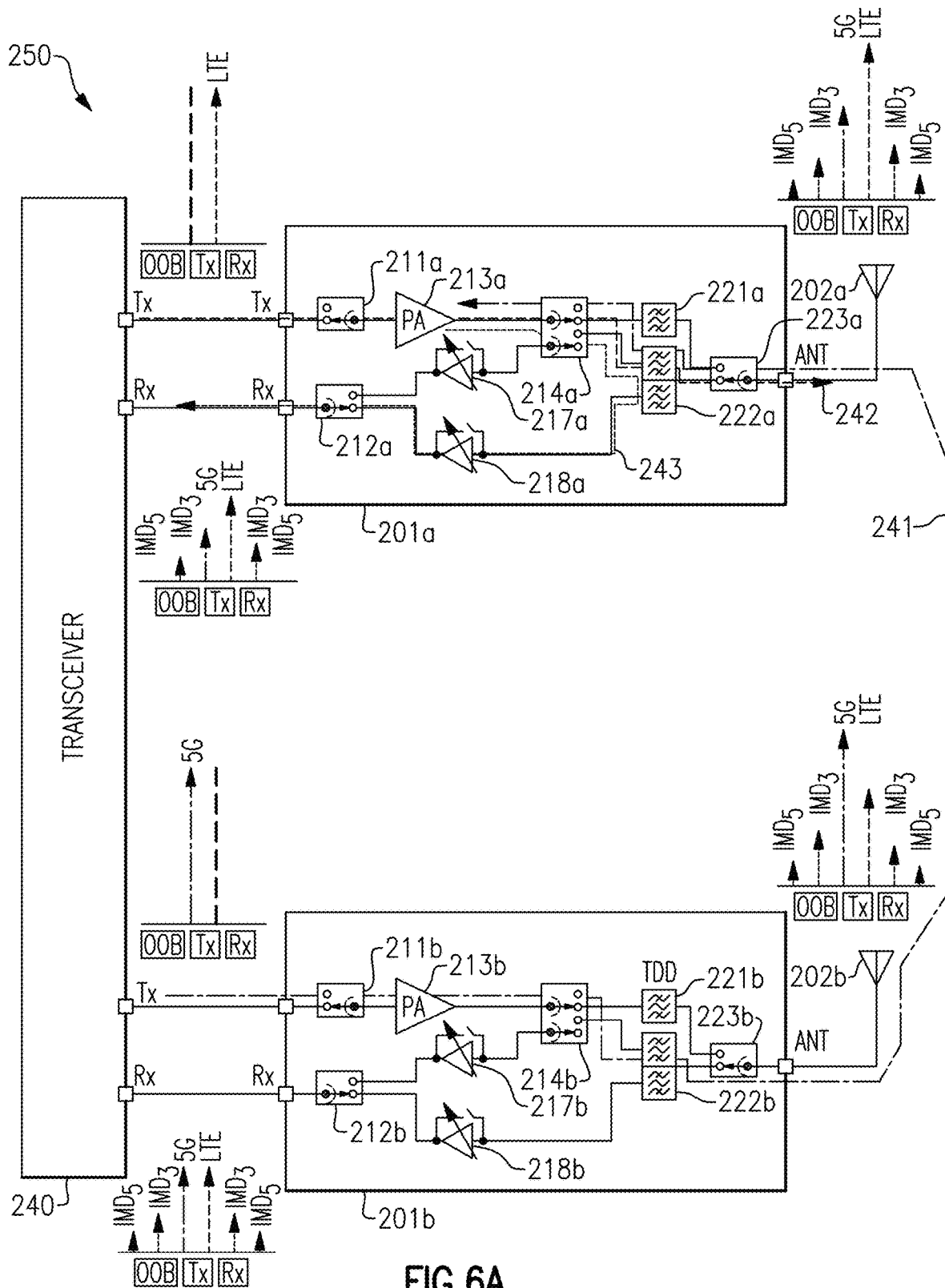
FIG. 6A is a schematic diagram of another embodiment of an RF communication system with partitioning and including one example of annotations related to intermodulation distortion.

FIG. 6A is a schematic diagram of another embodiment of an RF communication system 250 with partitioning and including one example of annotations related to intermodulation distortion. The RF communication system 250 includes a transceiver 240, a first RF front-end module 201a, a second RF front-end module 201b, a first antenna 202a, and a second antenna 202b.

As shown in FIG. 6A, the first RF front-end module 201a includes a first transmit selection switch 211a, a first receive selection switch 212a, a first power amplifier 213a, a first band selection transmit/receive switch 214a, a first TDD LNA 217a, a first FDD LNA 218a, a first TDD filter 221a, a first FDD duplexer 222a, and a first antenna switch 223a. Additionally, the second RF front-end module 201b includes a second transmit selection switch 211b, a second receive selection switch 212b, a second power amplifier 213b, a second band selection transmit/receive switch 214b, a second TDD LNA 217b, a second FDD LNA 218b, a second TDD filter 221b, a second FDD duplexer 222b, and a second antenna switch 223b.

Although one example implementation of an RF communication system is shown in FIG. 6A, the teachings herein are applicable to RF communication systems implemented in a wide variety of ways. For example, although one example of transmit chains is illustrated, other implementations of transmit chains are possible.

In this example, an LTE signal is transmitted through a first transmit chain associated with the first front-end module 201a and a 5G signal is transmitted through the a second transmit chain associated with the second front-end module 201b. The LTE signal and the 5G signal are in the same frequency band. In one embodiment, the LTE signal corresponds to an anchor carrier and the 5G signal corresponds to a secondary component carrier.

The RF communication system 250 has been annotated to show an LTE signal path 242, a 5G interferer signal path 241, and an intermodulation path 243. The intermodulation path 243 of FIG. 6A leads to less intermodulation distortion than the intermodulation path 224 of FIG. 5B. In particular, isolation between the first antenna 202a and the second antenna 202b results in a relatively small amount of the 5G signal from coupling from the second antenna 202b to the first antenna 202a. Moreover, intermodulation resulting from the 5G signal reaching the output of the first power amplifier 213a is relatively low, since output conversion gain of a power amplifier is typically much lower than input conversion gain. Since intermodulation arises from output conversion gain in FIG. 6A and input conversion gain in FIG. 5B, the intermodulation distortion in FIG. 6A is comparatively lower.

By partitioning an RF signal with a non-contiguous frequency allocation into multiple RF signals sent through separate transmit chains and separate antennas, lower intermodulation distortion and emissions result. Thus, intermodulation and emissions specifications can be realized without needing to operate with large MPR back-off. Thus, the RF communication system 250 of FIG. 6A is associated with higher output power capability relative to the RF communication system 230 of FIG. 5A.

It is understood that the 5G signal 241 is depicted in FIG. 6A as a back-injected interferer to the upper transmit path of the LTE signal 242, but that symmetric behavior of the LTE signal 242 also leaks through the antenna isolation to serve as a similar back-injected interferer to the 5G signal transmission from antenna 202b. For clarity of the figures, subsequent drawings of multiple antennas similarly illustrate just one of the interference mechanisms, but it is understood that a symmetric behavior of interference is present between two (or multiple) transmit chains interfering with each other.

Figure 6B:
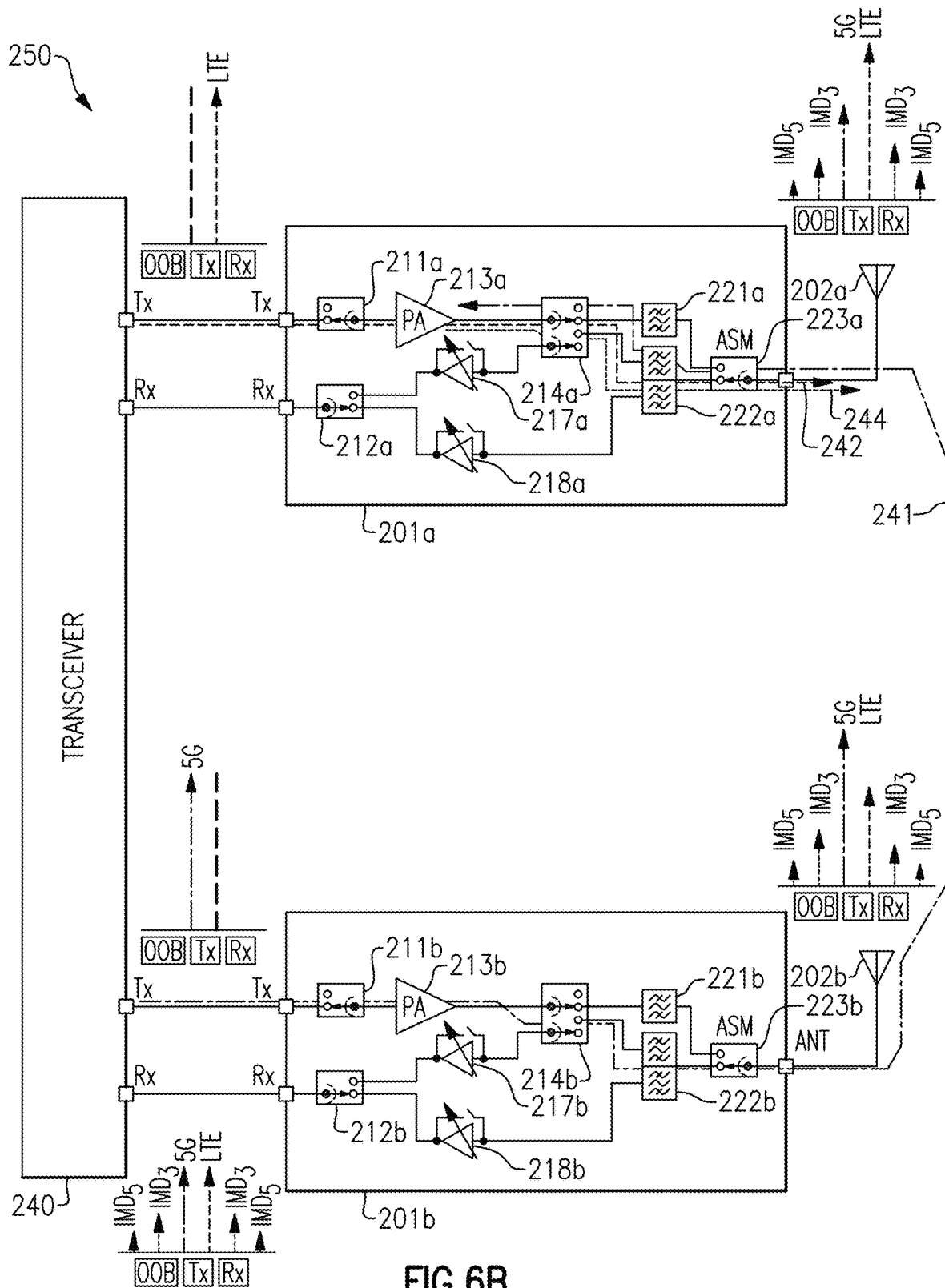
FIG. 6B is a schematic diagram of the RF communication system of FIG. 6A including another example of annotations related to intermodulation distortion.

FIG. 6B is a schematic diagram of the RF communication system 250 of FIG. 6A including another example of annotations related to intermodulation distortion. The annotations are similar to those shown in FIG. 6A, except than an additional intermodulation path 244 is shown.

The intermodulation path 244 of FIG. 6B leads to less intermodulation distortion radiated from the antenna than the intermodulation path 233 of FIG. 5A. In particular, isolation between the first antenna 202a and the second antenna 202b results in a relatively small amount of the 5G signal from coupling from the second antenna 202b to the first antenna 202a. Moreover, intermodulation resulting from the 5G signal reaching the output of the first power amplifier 213a is relatively low, since output conversion gain of a power amplifier is typically much lower than input conversion gain. Since intermodulation arises from output conversion gain in FIG. 6B and input conversion gain in FIG. 5A, the intermodulation distortion in FIG. 6B is comparatively lower.

Figure 7:
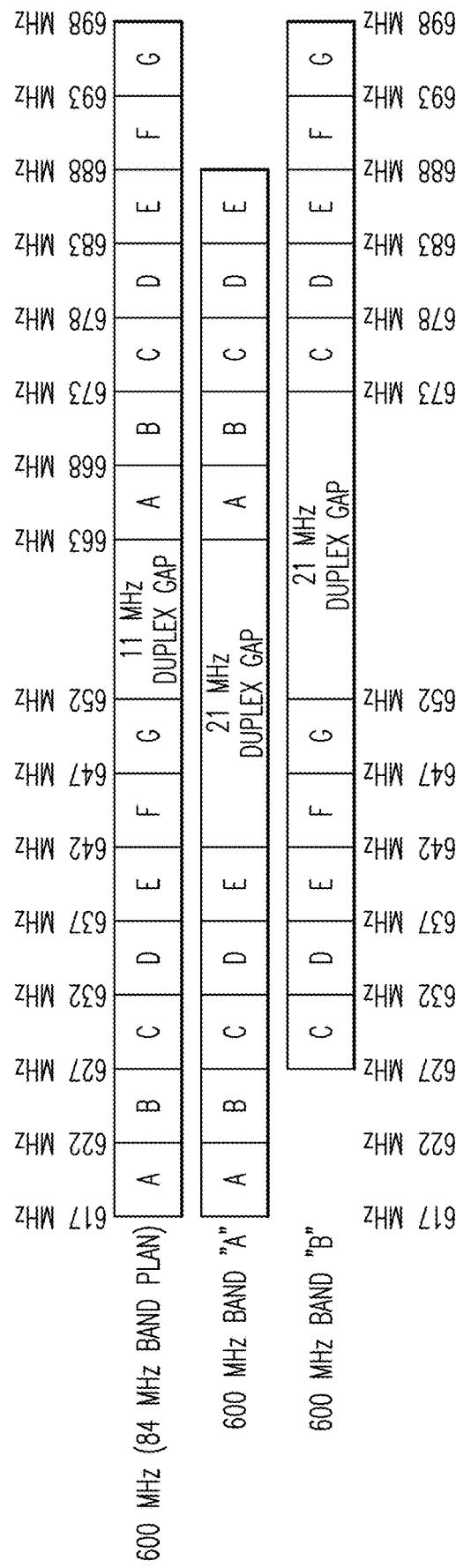
FIG. 7 is a table of frequency content related to Band 71.

FIG. 7 is a table of frequency content related to Band 71. Certain frequency bands, such as Band 71, can be split into sub-bands associated with partially overlapping frequency ranges. A band can be split into sub-bands for a variety of reasons, for instance, to overcome challenges of a narrow duplex gap and/or to provide superior passband bandwidth, lower insertion loss, and/or higher transmit/receive isolation.

In the illustrated example, Band 71 includes a first sub-band B71A including 5-MHz blocks A, B, C, D, and E for each of uplink and downlink. Furthermore, Band 71 includes a second sub-band B71B including 5-MHz blocks C, D, E, F, and G for each of uplink and downlink. As shown in FIG. 7, all 20 MHz placements are supported (for instance, ABCD or BCDE for B71A, and CDEF or DEFG for B71B).

Although one example of a split band is shown, other examples are possible, including, but not limited to, Band 28 (B28A and B28B).

The teachings herein can be used to partition signals associated with a wide variety of frequency bands, including, both bands that are not split into sub-bands and bands that are split into sub-bands.

Figure 8A:
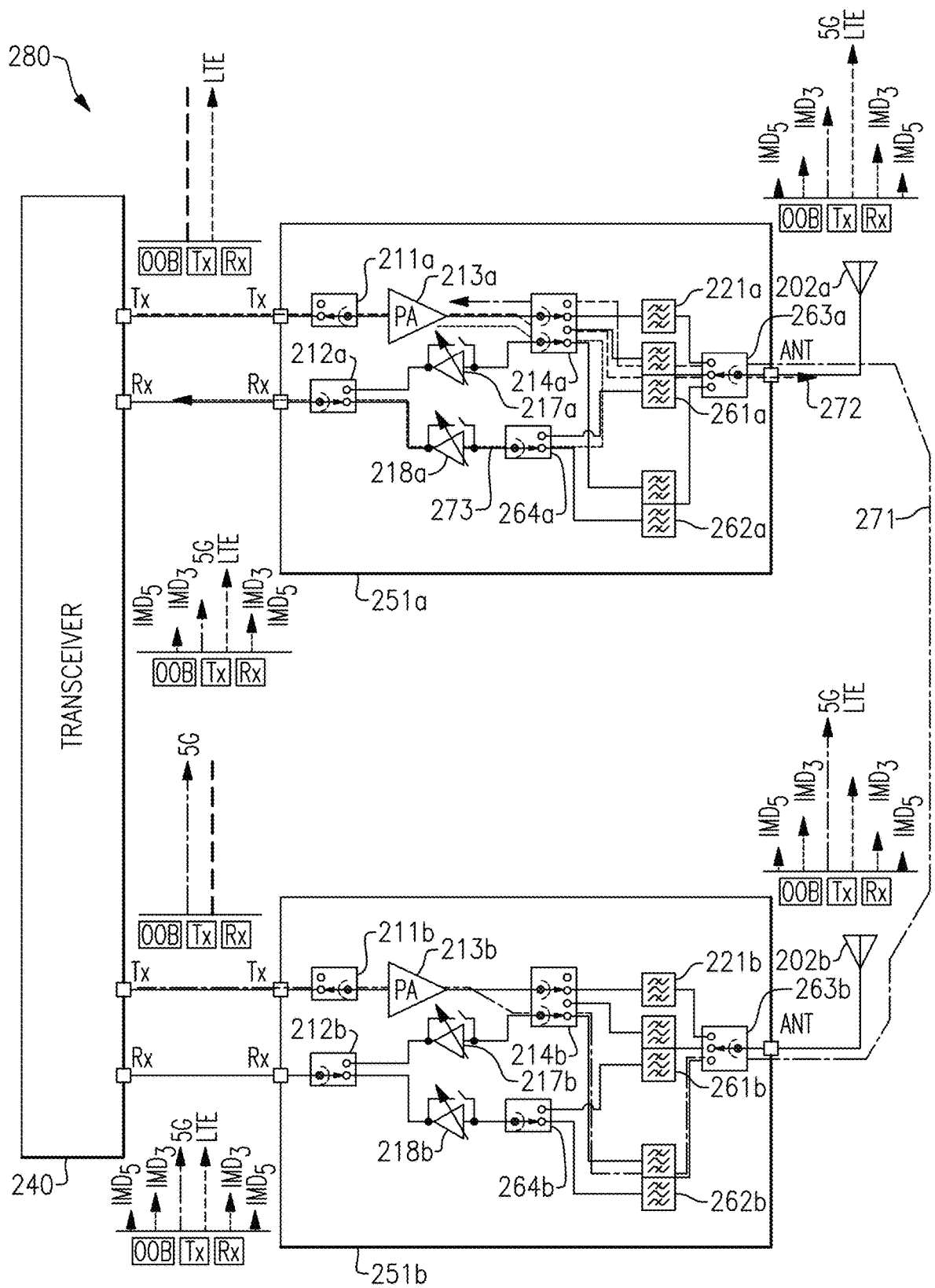
FIG. 8A is a schematic diagram of another embodiment of an RF communication system including one example of annotations related to intermodulation distortion.

FIG. 8A is a schematic diagram of another example of an RF communication system 280 including one example of annotations related to intermodulation distortion. The RF communication system 280 includes a transceiver 240, a first RF front-end module 251a, a second RF front-end module 251b, a first antenna 202a, and a second antenna 202b.

As shown in FIG. 8A, the first RF front-end module 251a includes a first transmit selection switch 211a, a first receive selection switch 212a, a first power amplifier 213a, a first band selection transmit/receive switch 214a, a first TDD LNA 217a, a first FDD LNA 218a, a first TDD filter 221a, a first lower sub-band FDD duplexer 261a, a first upper sub-band FDD duplexer 262a, a first antenna switch 263a, and a first receive selection switch 264a. Additionally, the second RF front-end module 251b includes a second transmit selection switch 211b, a second receive selection switch 212b, a second power amplifier 213b, a second band selection transmit/receive switch 214b, a second TDD LNA 217b, a second FDD LNA 218b, a second TDD filter 221b, a second lower sub-band FDD duplexer 261b, a second upper sub-band FDD duplexer 262b, a second antenna switch 263b, and a second receive selection switch 264b.

Although one embodiment of an RF communication system is shown in FIG. 8A, the teachings herein are applicable to RF communication systems implemented in a wide variety of ways.

In this example, an LTE signal is transmitted through a first transmit chain associated with the first front-end module 251a, and a 5G signal is transmitted through the a second transmit chain associated with the second front-end module 251b. The LTE signal and the 5G signal are in the same frequency band, which is split into a lower sub-band A and an upper sub-band B. For example, the frequency band can correspond to Band 71 as described above with reference to FIG. 7. In one embodiment, the LTE signal corresponds to an anchor carrier in Band 71 and the 5G signal corresponds to a secondary component carrier in Band 71.

In the illustrated embodiment, each of the front-end modules 251a and 251b includes a power amplifier for providing amplification to a Band 71 signal. As shown in FIG. 8A, each of the front-end modules can operate with duplexers associated sub-bands being selected.

The RF communication system 280 has been annotated to show a 5G interferer signal path 271, an LTE signal path 272, and an intermodulation path 273. The intermodulation path 273 of FIG. 8A is associated with relatively low intermodulation distortion. For example, antenna-to-antenna isolation results in a relatively small amount of the 5G signal coupling from the second antenna 202b to the first antenna 202a. Moreover, intermodulation resulting from the 5G signal reaching the output of the first power amplifier 213a is relatively low, since output conversion gain of a power amplifier is typically much lower than input conversion gain.

Thus, partitioning a modulated Band 71 signal into two separate RF signals provides a number of advantages. For example, transmission from separate antennas benefits from reverse back injection of a blocker instead of creating stronger intermodulation distortion through a single power amplifier when both signal frequency allocations are present at a power amplifier input. Furthermore, antenna isolation lowers the power of the back-injected blocker to reduce an amount of intermodulation distortion that is generated.

Moreover, when the 5G and LTE signals are allocated to non-overlapping regions of the duplexer 261a for B71A and duplexer 262b for B71B, filter attenuation serves to provide a significant reduction in creation of intermodulation products.

Figure 8B:
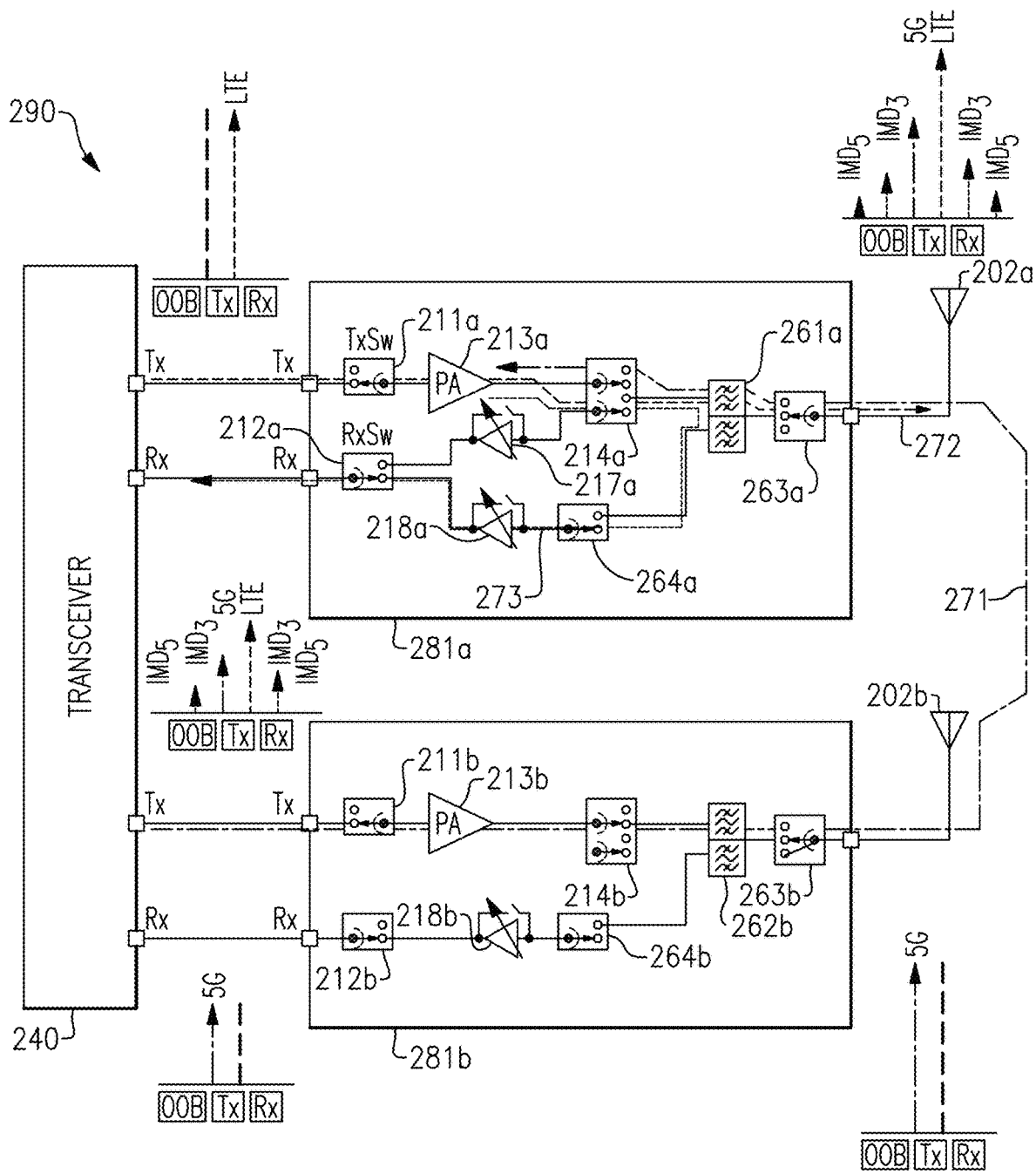
FIG. 8B is a schematic diagram of another embodiment of an RF communication system including one example of annotations related to intermodulation distortion.

FIG. 8B is a schematic diagram of another embodiment of an RF communication system 290 including one example of annotations related to intermodulation distortion. The RF communication system 290 includes a transceiver 240, a first RF front-end module 281a, a second RF front-end module 281b, a first antenna 202a, and a second antenna 202b.

In comparison to the first RF front-end module 251a of FIG. 8A, the first RF front-end module 281a of FIG. 8B includes the lower sub-band FDD duplexer 261a, but omits the upper sub-band FDD duplexer 262a. Additionally, in comparison to the second RF front-end module 251b of FIG. 8A, the second RF front-end module 281b of FIG. 8B includes the upper sub-band FDD duplexer 262b, but omits the lower sub-band FDD duplexer 261b.

Thus, in this embodiment, the separate transmit chains include duplicated power amplifiers but different implementations of filtering that are not duplicated, as was the case in the front-end modules of 251a and 251b in FIG. 8A. Moreover, for the embodiment of FIG. 8B, no additional filters are used relative to a single transmit chain that includes a duplexer 261a for B71A and a duplexer 262b for B71B. Thus, by duplicating a power amplifier, the connectivity and reduced IMD performance of this use case is provided.

In one embodiment, the RF communication system 290 is used to process Band 71 signals. Additionally, when the modulation is contiguous (for example, A+B or F+G) then one transmit chain is used. However, when non-contiguous modulations are used, separate transmit chains are used. For example, when transmitting an A+G non-contiguous modulation, a block A/B71A signal is transmitted via the first front-end module 281a and the first antenna 202a, and a block G/B71B signal is transmitted via the second front-end module 281b and the second antenna 202b.

Figure 9A:
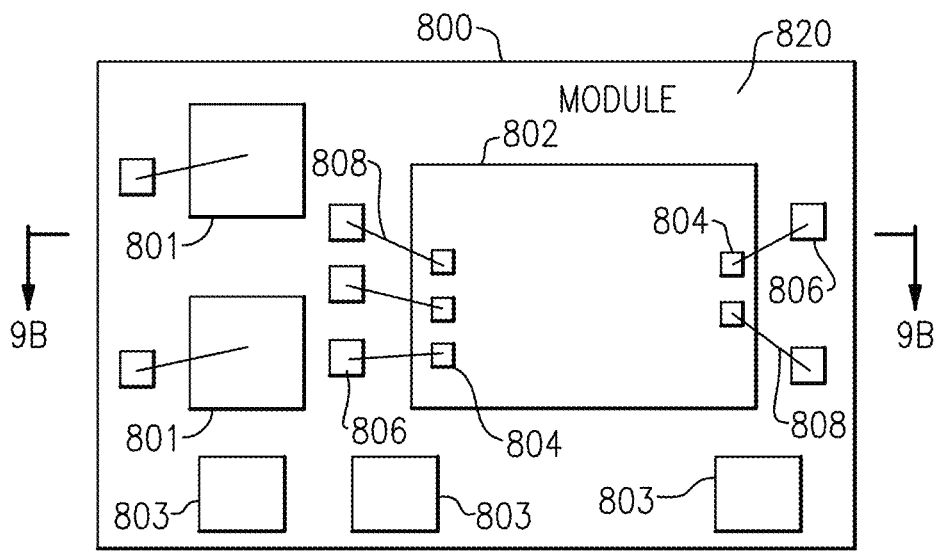
FIG. 9A is a schematic diagram of one embodiment of a packaged module.
Figure 9B:
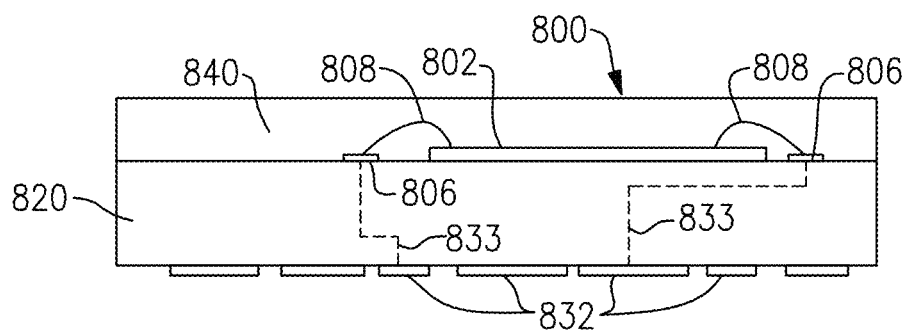
FIG. 9B is a schematic diagram of a cross-section of the packaged module of FIG. 9A taken along the lines 9B-9B.

FIG. 9A is a schematic diagram of one embodiment of a packaged module 800. FIG. 9B is a schematic diagram of a cross-section of the packaged module 800 of FIG. 9A taken along the lines 9B-9B.

Certain implementations of the RF communication systems herein include one or more packaged modules, such as the packaged module 800. Although the packaged module 800 of FIGS. 9A and 9B illustrates one example implementation of a module suitable for use in an RF communication system, other implementations of modules are possible.

The packaged module 800 includes radio frequency components 801, a semiconductor die 802, surface mount devices 803, wirebonds 808, a package substrate 820, and encapsulation structure 840. The package substrate 820 includes pads 806 formed from conductors disposed therein.

Additionally, the semiconductor die 802 includes pins or pads 804, and the wirebonds 808 have been used to connect the pads 804 of the die 802 to the pads 806 of the package substrate 820.

As shown in FIG. 9B, the packaged module 800 is shown to include a plurality of contact pads 832 disposed on the side of the packaged module 800 opposite the side used to mount the semiconductor die 802. Configuring the packaged module 800 in this manner can aid in connecting the packaged module 800 to a circuit board, such as a phone board of a wireless device. The example contact pads 832 can be configured to provide radio frequency signals, bias signals, and/or power (for example, a power supply voltage and ground) to the semiconductor die 802. As shown in FIG. 9B, the electrical connections between the contact pads 832 and the semiconductor die 802 can be facilitated by connections 833 through the package substrate 820. The connections 833 can represent electrical paths formed through the package substrate 820, such as connections associated with vias and conductors of a multilayer laminated package substrate.

In some embodiments, the packaged module 800 can also include one or more packaging structures to, for example, provide protection and/or facilitate handling. Such a packaging structure can include overmold or encapsulation structure 840 formed over the packaging substrate 820 and the components and die(s) disposed thereon.

It will be understood that although the packaged module 800 is described in the context of electrical connections based on wirebonds, one or more features of the present disclosure can also be implemented in other packaging configurations, including, for example, flip-chip configurations.

Figure 10:
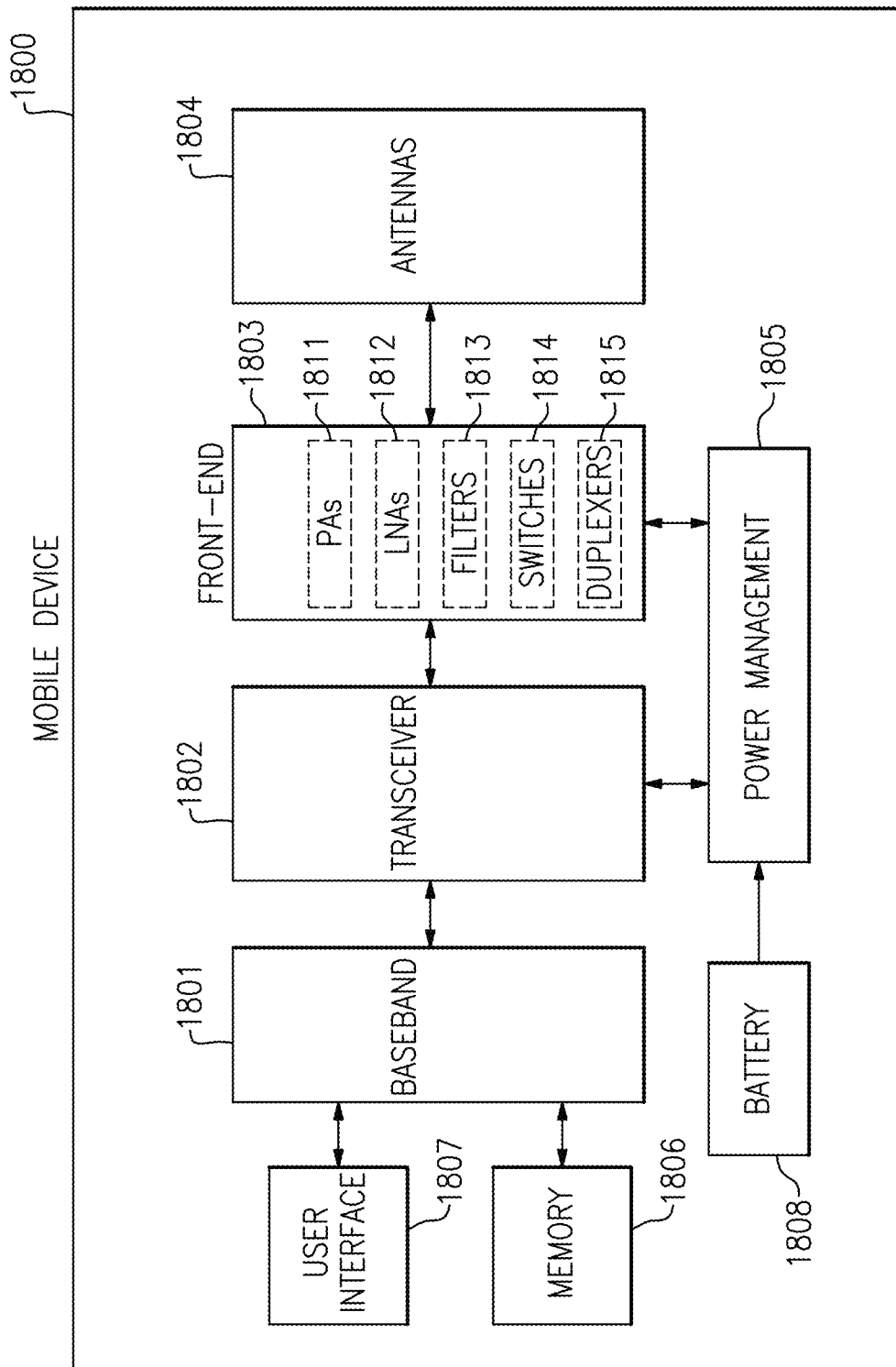
FIG. 10 is a schematic diagram of one embodiment of a mobile device.

FIG. 10 is a schematic diagram of one embodiment of a mobile device 1800. The mobile device 1800 includes a baseband system 1801, a transceiver 1802, a front-end system 1803, antennas 1804, a power management system 1805, a memory 1806, a user interface 1807, and a battery 1808.

The mobile device 1800 can be used communicate using a wide variety of communications technologies, including, but not limited to, 2G, 3G, 4G (including LTE, LTE-Advanced, and LTE-Advanced Pro), 5G NR, WLAN (for instance, Wi-Fi), WPAN (for instance, Bluetooth and ZigBee), WMAN (for instance, WiMax), and/or GPS technologies.

The transceiver 1802 generates RF signals for transmission and processes incoming RF signals received from the antennas 1804. It will be understood that various functionalities associated with the transmission and receiving of RF signals can be achieved by one or more components that are collectively represented in FIG. 10 as the transceiver 1802. In one example, separate components (for instance, separate circuits or dies) can be provided for handling certain types of RF signals.

The front-end system 1803 aids is conditioning signals transmitted to and/or received from the antennas 1804. In the illustrated embodiment, the front-end system 1803 includes power amplifiers (PAs) 1811, low noise amplifiers (LNAs) 1812, filters 1813, switches 1814, and duplexers 1815. However, other implementations are possible.

For example, the front-end system 1803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

The mobile device 1800 is implemented using one or more features disclosed herein. For example, the transceiver 1802 can partition a modulated signal into two or more RF signals for transmission on two or more of the antennas 1804 via separate transmit chains of the front-end system 1803.

In certain implementations, the mobile device 1800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 1804 can include antennas used for a wide variety of types of communications. For example, the antennas 1804 can include antennas for transmitting and/or receiving signals associated with a wide variety of frequencies and communications standards.

In certain implementations, the antennas 1804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 1800 can operate with beamforming in certain implementations. For example, the front-end system 1803 can include phase shifters having variable phase controlled by the transceiver 1802. Additionally, the phase shifters are controlled to provide beam formation and directivity for transmission and/or reception of signals using the antennas 1804. For example, in the context of signal transmission, the phases of the transmit signals provided to the antennas 1804 are controlled such that radiated signals from the antennas 1804 combine using constructive and destructive interference to generate an aggregate transmit signal exhibiting beam-like qualities with more signal strength propagating in a given direction. In the context of signal reception, the phases are controlled such that more signal energy is received when the signal is arriving to the antennas 1804 from a particular direction. In certain implementations, the antennas 1804 include one or more arrays of antenna elements to enhance beamforming.

The baseband system 1801 is coupled to the user interface 1807 to facilitate processing of various user input and output (I/O), such as voice and data. The baseband system 1801 provides the transceiver 1802 with digital representations of transmit signals, which the transceiver 1802 processes to generate RF signals for transmission. The baseband system 1801 also processes digital representations of received signals provided by the transceiver 1802. As shown in FIG. 10, the baseband system 1801 is coupled to the memory 1806 of facilitate operation of the mobile device 1800.

The memory 1806 can be used for a wide variety of purposes, such as storing data and/or instructions to facilitate the operation of the mobile device 1800 and/or to provide storage of user information.

The power management system 1805 provides a number of power management functions of the mobile device 1800. In certain implementations, the power management system 1805 includes a PA supply control circuit that controls the supply voltages of the power amplifiers 1811. For example, the power management system 1805 can be configured to change the supply voltage(s) provided to one or more of the power amplifiers 1811 to improve efficiency, such as power added efficiency (PAE).

As shown in FIG. 10, the power management system 1805 receives a battery voltage from the battery 1808. The battery 1808 can be any suitable battery for use in the mobile device 1800, including, for example, a lithium-ion battery.

Applications

Some of the embodiments described above have provided examples in connection with mobile devices. However, the principles and advantages of the embodiments can be used for any other systems or apparatus that have needs for filter bypass. Examples of such RF communication systems include, but are not limited to, mobile phones, tablets, base stations, network access points, customer-premises equipment (CPE), laptops, and wearable electronics.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A mobile device comprising:
a plurality of antennas including a first antenna and a second antenna;
a front end system including a first front-end module electrically connected to the first antenna, the first front-end module including at least a first intermodulation path having at least a first transmit/receive switch and a first intermodulation duplexer switch connected to at least a first intermodulation duplexer, and a second front-end module electrically connected to the second antenna, the second front-end module including at least a second intermodulation path having at least a second transmit/receive switch and a second intermodulation duplexer switch connected to at least a second intermodulation duplexer; and
a transceiver configured to partition a transmit signal of a first frequency band into first and second radio frequency signals of within the first frequency band when modulation is non-contiguous, the transceiver further configured to allocate at least a portion of the first and second radio frequency signals within the first frequency band to non-overlapping regions of the first and second intermodulation duplexers, the first intermodulation duplexer providing a first non-overlapping blocker signal to the second front-end module and the second intermodulation duplexer providing a second non-overlapping blocker signal to the first front-end module, the transceiver further controls a plurality of phase shifters to provide beam formation of the first and second radio frequency signals when transmitted by the first and second antennas.

2. The mobile device of claim 1 wherein the first front-end module includes a first power amplifier configured to amplify the first radio frequency signal, and the second front-end module includes a second power amplifier configured to amplify the second radio frequency signal.

3. The mobile device of claim 1 wherein the first radio frequency signal and the second radio frequency signal correspond to non-contiguous resource block allocations in a common channel of the first frequency band.

4. The mobile device of claim 1 wherein the first radio frequency signal corresponds to a first resource block allocation in a first channel of the first frequency band, and the second radio frequency signal corresponds to a second resource block allocation in a second channel of the first frequency band.

5. The mobile device of claim 4 wherein the first channel and the second channel are non-contiguous in frequency and the first and second resource block allocations are separated in frequency.

6. The mobile device of claim 5 wherein the first and second resource block allocations are separated in frequency by less than about 35 megahertz.

7. The mobile device of claim 1 wherein the first front-end module includes a different configuration of filters relative to the second front-end module.

8. The mobile device of claim 7 wherein the first front-end module includes one or more filters for filtering a first sub-band of the first frequency band, and the second front-end module includes one or more filters for filtering a second sub-band of the first frequency band.

9. The mobile device of claim 8 wherein the first front-end module does not include any filters for filtering the second sub-band, and the second front-end module does not include any filters for filtering the first sub-band.

10. The mobile device of claim 1 wherein the first frequency band is Band 71.

11. A radio frequency communication system comprising:
a plurality of antennas including a first antenna and a second antenna;
a plurality of transmit chains including a first transmit chain configured to transmit on the first antenna, the first transmit chain including at least a first intermodulation path having at least a first transmit/receive switch and a first intermodulation duplexer switch connected to at least a first intermodulation duplexer, and a second transmit chain configured to transmit on the second antenna, the second transmit chain including at least a second intermodulation path having at least a second transmit/receive switch and a second intermodulation duplexer switch connected to at least a second intermodulation duplexer in a second intermodulation path; and
a transceiver configured to partition a modulation signal of a first frequency band to generate a first and second radio frequency signals of within the first frequency band when the modulation is non-contiguous, to allocate at least a portion of the first and second radio frequency signals within the first frequency band to non-overlapping regions of the first and second intermodulation duplexers, the first intermodulation duplexer providing a first non-overlapping blocker signal to the second transmit chain and the second intermodulation duplexer providing a second non-overlapping blocker signal to the first transmit chain, and the transceiver configured to control a plurality of phase shifters to provide beam formation of the first and second radio frequency signals when transmitted by the first and second antennas.

12. The radio frequency communication system of claim 11 wherein the first radio frequency signal and the second radio frequency signal correspond to non-contiguous resource block allocations in a common channel of the first frequency band.

13. The radio frequency communication system of claim 11 wherein the first radio frequency signal corresponds to a first resource block allocation in a first channel of the frequency first band, and the second radio frequency signal corresponds to a second resource block allocation in a second channel of the first frequency band.

14. The radio frequency communication system of claim 11 wherein the first transmit chain includes a first power amplifier configured to amplify the first radio frequency signal, and the second transmit chain includes a second power amplifier configured to amplify the second radio frequency signal.

15. The radio frequency communication system of claim 11 wherein the first transmit chain includes a different configuration of filters relative to the second transmit chain.

16. The radio frequency communication system of claim 15 wherein the first transmit chain includes one or more filters for filtering a first sub-band of the first frequency band, and the second transmit chain includes one or more filters for filtering a second sub-band of the first frequency band.

17. The radio frequency communication system of claim 16 wherein the first transmit chain does not include any filters for filtering the second sub-band, and the second transmit chain does not include any filters for filtering the first sub-band.

18. A method of signal transmission in a radio frequency communication device, the method comprising:
partitioning a modulated signal into at least a first and second radio frequency signals of a first frequency band, and allocating at least a portion of the first and second radio frequency signals within the first frequency band to non-overlapping regions of a first intermodulation duplexer in a first transmit chain and a second intermodulation duplexer in a second transmit chain;
providing with the first intermodulation duplexer a first non-overlapping blocker signal to the second transmit chain;
providing with the second intermodulation duplexer a second non-overlapping blocker signal to the first transmit chain;
processing the first radio frequency signal using the first transmit chain to generate a first radio frequency output signal, the processing in the first transmit chain further including switching between receive and transmit modes in a first intermodulation path with a first transmit/receive switch, and selecting at least a first intermodulation duplexer with a first intermodulation duplexer switch;
processing the second radio frequency signal using the second transmit chain to generate a second radio frequency output signal, the processing in the second transmit chain further including switching between receive and transmit modes in a second intermodulation path with a first transmit/receive switch, and selecting at least a second intermodulation duplexer with a second intermodulation duplexer switch; and
controlling a plurality of phase shifters to provide beam formation of the first and second radio frequency signals when transmitted by at least first and second antennas.

19. The method of claim 18 wherein processing the first radio frequency signal using the first transmit chain includes amplifying the first radio frequency signal using a first power amplifier, and processing the second radio frequency signal using the second transmit chain includes amplifying the second radio frequency signal using a second power amplifier.

20. The method of claim 18 further comprising filtering the first radio frequency signal using one or more filters of a first sub-band of the first frequency band and filtering the second radio frequency signal using one or more filters of a second sub-band of the first frequency band.

\* \* \* \* \*